United States Patent
Yanagi et al.

(10) Patent No.: US 9,444,121 B2
(45) Date of Patent: Sep. 13, 2016

(54) MANUFACTURING METHOD FOR SULFIDE-BASED SOLID ELECTROLYTE MATERIAL

(71) Applicant: Toyota Jidosha Kabushiki Kaisha, Toyota-shi, Aichi-ken (JP)

(72) Inventors: Takuo Yanagi, Toyota (JP); Takayoshi Doi, Toyota (JP); Takumi Tanaka, Shizuoka (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 242 days.

(21) Appl. No.: 14/212,349

(22) Filed: Mar. 14, 2014

(65) Prior Publication Data

US 2014/0272554 A1    Sep. 18, 2014

(30) Foreign Application Priority Data

Mar. 15, 2013    (JP) .................................. 2013-053163

(51) Int. Cl.
*H01M 10/0562* (2010.01)
*H01M 10/052* (2010.01)

(52) U.S. Cl.
CPC ....... *H01M 10/0562* (2013.01); *H01M 10/052* (2013.01); *H01M 2300/0068* (2013.01); *Y02E 60/122* (2013.01); *Y02P 70/54* (2015.11)

(58) Field of Classification Search
CPC ...................... H01M 10/0562; H01M 10/052
See application file for complete search history.

(56) References Cited

FOREIGN PATENT DOCUMENTS

| JP | 07-242414 A | 9/1995 |
| JP | 2013-016423 A | 1/2013 |
| WO | 2013005085 A1 | 1/2013 |

*Primary Examiner* — Helen O Conley
(74) *Attorney, Agent, or Firm* — Dinsmore & Shohl LLP (57) ABSTRACT

A manufacturing method for a sulfide-based solid electrolyte material includes: preparing a raw material mixture, containing LiHS and LiX (X is one of F, Cl, Br and I), from a single lithium source; and desorbing hydrogen sulfide from the LiHS in the raw material mixture to form $Li_2S$ and synthesizing a sulfide-based solid electrolyte material from the LiX and the $Li_2S$.

8 Claims, 6 Drawing Sheets

MANUFACTURING METHOD FOR SULFIDE-BASED SOLID ELECTROLYTE MATERIAL

INCORPORATION BY REFERENCE

The disclosure of Japanese Patent Application No. 2013-053163 filed on Mar. 15, 2013 including the specification, drawings and abstract is incorporated herein by reference in its entirety.

BACKGROUND OF THE INVENTION

1. Field of the Invention

The invention relates to a highly-productive manufacturing method for a sulfide-based solid electrolyte material.

2. Description of Related Art

With a rapid proliferation of information-related equipment and communication equipment, such as personal computers, camcorders and cellular phones, in recent years, it becomes important to develop a battery used as a power supply of the information-related equipment or the communication equipment. In addition, in automobile industry, or the like, development of a high-power and high-capacity battery for electric vehicles or hybrid vehicles has been proceeding. Currently, among various types of battery, a lithium secondary battery becomes a focus of attention in terms of high energy density.

Currently commercially available lithium secondary batteries employ an electrolytic solution that contains a flammable organic solvent. Therefore, it is necessary to install a safety device that suppresses an increase in temperature in the event of a short circuit or improve a structure or a material for short-circuit prevention. In contrast to this, lithium secondary batteries in which an electrolytic solution is replaced with a solid electrolyte layer do not use a flammable organic solvent in the batteries. For this reason, it is considered that the safety devices for the lithium secondary batteries are simplified and the lithium secondary batteries are excellent in manufacturing cost and productivity. Furthermore, a sulfide-based solid electrolyte material is known as a solid electrolyte material that is used for the solid electrolyte layer.

The sulfide-based solid electrolyte material has a high lithium ion conductivity, so it is useful to obtain a high-power battery. Therefore, various researches have been carried out so far. For example, Japanese Patent Application Publication No. 2013-16423 (JP 2013-16423 A) describes an $Li_2S$—$P_2S_5$—LiI-series sulfide-based solid electrolyte material.

On the other hand, Japanese Patent Application Publication No. 7-242414 (JP 7-242414 A) describes a method of synthesizing an alkali metal iodide (NaI, KI) in an aqueous solution by using iodine and an organic reductant.

For example, when the sulfide-based solid electrolyte material is synthesized by using $Li_2S$, $P_2S_5$ and LiX (X is one of F, Cl, Br and I), $Li_2S$, $P_2S_5$ and LiX have been separately prepared and then synthesized with one another so far. With such a manufacturing method, there is an inconvenience that the productivity of a sulfide-based solid electrolyte material is low.

SUMMARY OF THE INVENTION

The invention provides a highly-productive manufacturing method for a sulfide-based solid electrolyte material.

An aspect of the invention provides a manufacturing method for a sulfide-based solid electrolyte material. The manufacturing method includes: preparing a raw material mixture, containing LiHS and LiX (X is one of F, Cl, Br and I), from a single lithium source; and desorbing hydrogen sulfide from the LiHS in the raw material mixture to form $Li_2S$ and synthesizing a sulfide-based solid electrolyte material from the LiX and the $Li_2S$.

According to the aspect of the invention, by preparing a raw material mixture containing LiHS and LiX from a single lithium source, it is possible to integrate steps, so it is possible to obtain a sulfide-based solid electrolyte material with high productivity.

In the aspect of the invention, preparing the raw material mixture may include providing a precursor aqueous solution containing LiOH and the LiX by subjecting an Li-containing aqueous solution to a reduction method that uses $X_2$ (X is one of F, Cl, Br and I) and a reductant; obtaining a precursor mixture containing the LiOH and the LiX by removing moisture through drying of the precursor aqueous solution; and sulfurizing the LiOH in the precursor mixture to form the LiHS.

In the aspect of the invention, providing the precursor aqueous solution may include subjecting a first aqueous solution containing an Li salt to the reduction method to produce a second aqueous solution containing the Li salt and the LiX and hydroxylating the Li salt in the second aqueous solution to form the LiOH.

In the aspect of the invention, providing the precursor aqueous solution may include subjecting a third aqueous solution containing a hydroxide of a metal (Me) to the reduction method to produce a fourth aqueous solution containing the hydroxide of the Me and a halide of the Me and a substitution process of substituting the Me in the fourth aqueous solution by Li.

In the aspect of the invention, t providing the precursor aqueous solution may include subjecting separated part of a fifth aqueous solution containing the LiOH to the reduction method to produce a sixth aqueous solution containing the LiX and mixing the sixth aqueous solution with the remaining part of the fifth aqueous solution.

In the aspect of the invention, sulfurizing the LiOH may sulfurize the LiOH in a polar solvent.

In the aspect of the invention, the synthesizing process may include an amorphizing process, and the sulfide-based solid electrolyte material may be a sulfide glass.

In the aspect of the invention, the synthesizing process may include an amorphizing process and a heat treatment, and the sulfide-based solid electrolyte material may be a glass ceramics.

The manufacturing method for a sulfide-based solid electrolyte material according to the aspect of the invention has such an advantage that the productivity is high by using a single lithium source.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a manufacturing method for a sulfide-based solid electrolyte material according to the invention will be described in detail.

The manufacturing method for a sulfide-based solid electrolyte material according to the invention includes a preparation step and an electrolyte synthesizing step. In the preparation step, a raw material mixture containing LiHS and LiX (X is one of F, Cl, Br and I) is prepared from a single lithium source. The electrolyte synthesizing step includes a dehydrosulfurizing process and a synthesizing process. In the dehydrosulfurizing process, hydrogen sulfide is desorbed from the LiHS in the raw material mixture to form $Li_2S$. In the synthesizing process, the sulfide-based solid electrolyte material is synthesized.

Figure 1:
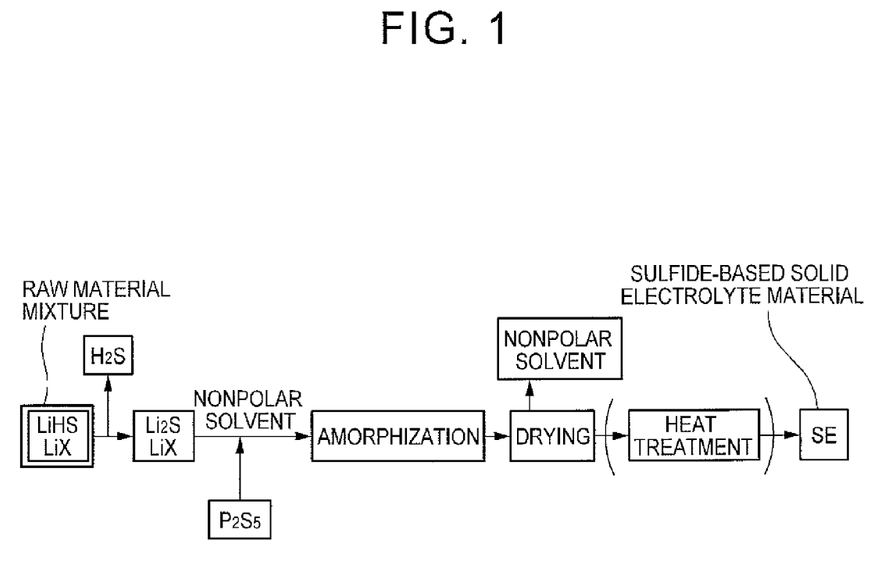
FIG. 1 is a flowchart that shows an example of a manufacturing method for a sulfide-based solid electrolyte material according to the invention.

FIG. 1 is a flowchart that shows an example of the manufacturing method for a sulfide-based solid electrolyte material according to the invention. In FIG. 1, initially, a raw material mixture containing LiHS and LiX (X is one of F, Cl, Br and I) is prepared from a single lithium source. Specific preparation methods will be described later in detail with reference to FIG. 3 to FIG. 5. Subsequently, hydrogen sulfide is desorbed from the LiHS in the raw material mixture to form $Li_2S$. Subsequently, the obtained mixture is dispersed in a nonpolar solvent, and a predetermined composition (for example, $P_2S_5$) is added to be amorphized. After that, by removing the nonpolar solvent through drying, a sulfide-based solid electrolyte material that is a sulfide glass is obtained. By subjecting the sulfide glass to heat treatment after the sulfide glass is produced, a sulfide-based solid electrolyte material that is a glass ceramics is obtained.

Figure 2:
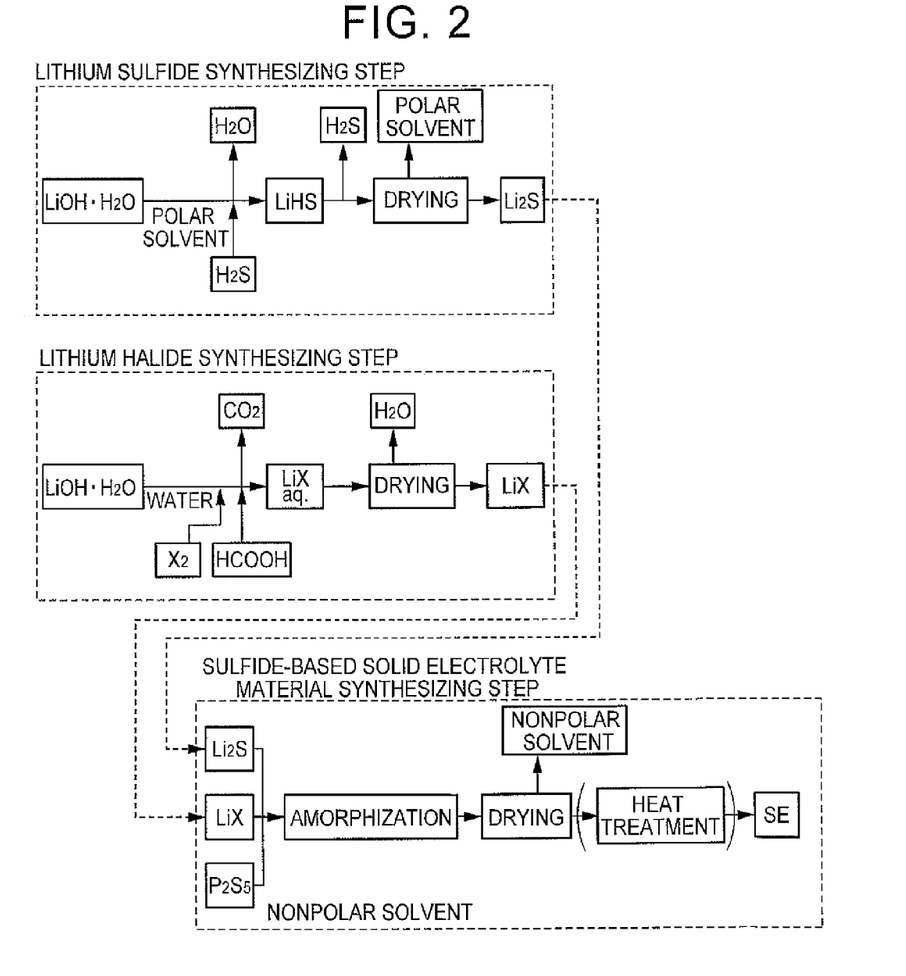
FIG. 2 is a flowchart that illustrates an existing manufacturing method for a sulfide-based solid electrolyte material.

According to the invention, by preparing a raw material mixture containing LiHS and LiX from a single lithium source, it is possible to integrate steps, so it is possible to obtain a sulfide-based solid electrolyte material with high productivity. Here, FIG. 2 is a flowchart that illustrates an existing manufacturing method for a sulfide-based solid electrolyte material. As shown at the lower side in the drawing, in an existing synthesizing step for a sulfide-based solid electrolyte material, ordinarily, $Li_2S$, LiX and $P_2S_5$ are separately provided and amorphized in a nonpolar solvent (for example, heptane). Thus, the sulfide-based solid electrolyte material is obtained. Various existing synthesizing methods for lithium sulfide are known, and the following method is one example of them. That is, as shown in FIG. 2, initially, hydrogen sulfide is caused to react with $LiOH.H_2O$ in a polar solvent (for example, in NMP) to produce LiHS. Subsequently, hydrogen sulfide is desorbed by heating LiHS ($2LiHS \rightarrow Li_2S + H_2S$), and $Li_2S$ is obtained by removing the polar solvent. Various existing synthesizing methods for a lithium halide are also known, and the following method is one example of them. That is, as shown in FIG. 2, initially, an aqueous solution containing LiX is produced by causing $X_2$ (for example, $I_2$) and a reductant (for example, formic acid) to react with $LiOH.H_2O$ in water. Subsequently, LiX is obtained by removing moisture.

In the invention, by producing a raw material mixture containing LiHS (a raw material of $Li_2S$) and LiX from a single lithium source, it is possible to eliminate overlapped steps, and it is possible to integrate the steps. Specifically, it is possible to reduce the number of steps, the number of drying processes, the number of solvents and the number of reaction containers. Thus, it is possible to obtain a sulfide-based solid electrolyte material with high productivity as compared to the existing technique. For example, when $Li_2S$ and LiX are purchased from different makers, there are a possibility of an increase in cost due to an intermediate margin in distribution, a possibility of an increase in variations in quality and a possibility of a complicated traceability in case of an inconvenience. In contrast, the manufacturing method for a sulfide-based solid electrolyte material according to the invention has such an advantage that these possibilities are decreased. Hereinafter, the manufacturing method for a sulfide-based solid electrolyte material according to the invention will be described step by step.

1. Preparation Step

The preparation step according to the invention is a step of preparing a raw material mixture containing LiHS and LiX (X is one of F, Cl, Br and I) from a single lithium source.

The raw material mixture according to the invention contains LiHS (also referred to as lithium hydrosulfide or LiSH) and a lithium halide (LiX). The above X is ordinarily F, Cl, Br or I. Among others, I is desirable. The raw material mixture may contain two or more lithium halides.

The preparation method for the raw material mixture is not specifically limited as long as the method is able to synthesize LiHS and LiX from the single lithium source. Among others, in the invention, the raw material mixture is desirably obtained through a sulfurizing step in which LiOH in a precursor mixture containing LiOH and LiX is sulfurized to form LiHS. This is because LiHS is allowed to be easily obtained by sulfurizing LiOH. The LiOH in the precursor mixture may be a hydrate ($LiOH.H_2O$), but the LiOH desirably does not include hydrated water. This is because it is possible to suppress degradation of an intended sulfide-based solid electrolyte material. Similarly, the LiX in the precursor mixture may be a hydrate, but the LiX desirably does not include hydrated water.

The sulfurizing method for the LiOH is not specifically limited. The sulfurizing method may be, for example, a method of causing sulfurizing gas to react with the precursor mixture. The sulfurizing gas may be, for example, $H_2S$, $CS_2$, elemental sulfur vapor, or the like. Among others, the sulfurizing gas is desirably $H_2S$ or $CS_2$. This is because the elemental sulfur vapor may flocculate or may produce high-polymer sulfur depending on a condition. The sulfurizing gas may be diluted by inert gas, such as argon gas. The temperature at which the sulfurizing gas is caused to react desirably, for example, falls within the range of 0° C. to 200° C., and more desirably falls within the range of 100° C. to 150° C. A period of time during which the sulfurizing gas is caused to react desirably, for example, falls within the range of 10 minutes to 180 minutes.

LiOH is desirably sulfurized in a state where the precursor mixture is dissolved or dispersed in a solvent or in an inert gas atmosphere. Among others, the former is desirable. The solvent according to the invention includes not only a proper solvent in which a solute is dissolved but also a dispersion medium. Particularly, in the invention, LiOH is desirably sulfurized in a polar solvent. This is because it is possible to efficiently sulfurize LiOH. For example, as will be described later, when the precursor mixture is produced by removing moisture through drying of the precursor aqueous solution containing LiOH and LiX, there may be a phenomenon that the LiOH and the LiX strongly interact with each other and, as a result, the LiOH is hard to be sulfurized. This phenomenon is remarkable in the case where the LiX is LiI. Even when the LiOH and the LiX strongly interact with each other, it is possible to reduce the interaction between the LiOH and the LiX with the use of a polar solvent, so it is possible to efficiently sulfurize the LiOH.

The polar solvent is not specifically limited as long as the polar solvent is able to reduce the interaction between the LiOH and the LiX. The polar solvent desirably dissolves at least part of LiOH. The solubility of a solute ordinarily increases as a solvent is heated, so it is desirable to sulfurize the LiOH by heating the solvent to such a degree that the solute is dissolved. The polar solvent may be specifically a protic polar solvent. An example of the protic polar solvent may be an alcohol having a carbon number of 1 to 8. The alcohol may be specifically methanol, ethanol, propanol, butanol, t-butyl alcohol, 2-pentanol, 2-methyl-1-butanol, 2,2-dimethyl-1-propanol, or the like. Another example of the protic polar solvent may be phenols, such as phenol and cresol.

On the other hand, the inert gas atmosphere may be, for example, an argon gas atmosphere, a nitrogen gas atmosphere, or the like.

The method of obtaining a precursor mixture containing LiOH and LiX is not specifically limited. Among others, in the invention, it is desirable to obtain a precursor mixture through a drying step in which the precursor mixture is obtained by removing moisture through drying of a precursor aqueous solution containing LiOH and LiX. This is because it is possible to obtain a precursor mixture in which LiOH and LiX are dispersed in molecular level. The "aqueous solution" in the invention is a solution at least containing water as a solvent, may include only water as the solvent or may further contain a solvent other than water. Particularly, the aqueous solution desirably has a water percentage of 50 percent by weight with respect to the entire solvent. These points do not only apply to the precursor aqueous solution but also similarly apply to another aqueous solution (described later).

In the precursor aqueous solution, the molar ratio of LiOH to LiI (MLiOH/MLiI) may be selected as needed depending on the percentage of LiI contained in an intended sulfide-based solid electrolyte material. For example, the molar ratio is desirably higher than or equal to I and more desirably higher than or equal to 4. Considering the phase diagram of an LiI—LiOH system, the phase diagram shows that a stable phase is formed when LiI:LiOH=1:1 or when LiI:LiOH=1:4. Particularly, it is assumed that the stable phase at LiI:LiOH=1:4 can maintain a solid state until 340° C.

The total concentration of LiOH and LiI in the precursor aqueous solution is not specifically limited. The total concentration is desirably, for example, higher than 0.2 percent by weight. On the other hand, the total concentration is, for example, lower than 10 percent by weight.

The drying method is not specifically limited. The drying method may be heat drying, drying under reduced pressure (drying in a vacuum), freeze drying, spray drying, any combination of them, or the like. The freeze drying is ordinarily a method of drying a solvent by freezing an object, reducing a pressure with a vacuum pump and then allowing the solvent to sublimate. In the case of the heat drying, the heating temperature is not specifically limited. For example, the heating temperature desirably falls within the range of 50° C. to 200° C., and more desirably falls within the range of 100° C. to 150° C. When the drying temperature is too low, it may not be possible to sufficiently remove moisture. When the drying temperature is too high, an unnecessary side reaction may occur. In the invention, it is desirable to carry out the above-described sulfurizing step after the drying step.

The method of obtaining the precursor aqueous solution containing LiOH and LiX is not specifically limited. Among others, in the invention, the precursor aqueous solution is desirably obtained through a providing step in which the precursor aqueous solution is provided by subjecting an Li-containing aqueous solution to a reduction method that uses $X_2$ (X is one of F, Cl, Br and I) and a reductant. The reductant is not specifically limited as long as the reductant is able to produce LiX. The reductant is desirably an organic reductant. The organic reductant may be, for example, an organic acid, such as a carboxylic acid, an alkali metal salt of the above-described organic acid, or the like. The carboxylic acid may be, for example, formic acid, oxalic acid, malonic acid, pyruvic acid, lactic acid, ascorbic acid, or the like. Among others, the formic acid is desirable. This is because the structure is simple and, therefore, an unnecessary component does not remain in a sulfide-based solid electrolyte material.

The pH of the Li-containing aqueous solution is not specifically limited. For example, the pH desirably falls within the range of 4 to 11, and more desirably falls within the range of 5 to 10. This is because a reduction reaction easily occurs. The amount of the reductant with respect to $X_2$ is not specifically limited. For example, the amount of the reductant desirably falls within the range of 1.0 mol to 1.1 mol with respect to 1 mol of $X_2$, and more desirably falls within the range of 1.02 mol to 1.08 mol with respect to 1 mol of $X_2$. Heating may be carried out in the reduction step. The heating temperature, for example, falls within the range of 25° C. to 95° C. In the invention, the above-described drying step is desirably carried out after the providing step. In addition, the above-described sulfurizing step is desirably carried out after the drying step.

In addition, the providing step is not specifically limited as long as the providing step is a step in which a precursor aqueous solution is obtained from a single lithium source. The type of lithium source is not specifically limited. For example, the lithium source may be an Li salt, an Li hydroxide, or the like. The Li salt may be a nonorganic Li salt or may be an organic Li salt. The nonorganic Li salt may be, for example, lithium carbonate, lithium chloride, lithium nitrate, or the like. Among others, lithium carbonate is desirable. This is because lithium carbonate is not expensive and no unnecessary component remains in a sulfide-based solid electrolyte material. The organic Li salt may be, for example, an Li salt of an organic acid. Among others, the organic Li salt may be an Li salt of carboxylic acid, or the like. The Li salt of carboxylic acid may be, for example, lithium formate, or the like. The Li hydroxide may be, for example, lithium hydroxide. A typical example of the providing step according to the invention will be illustrated separately in three embodiments.

(1) First Embodiment

In a first embodiment, the providing step is a step including a reduction process and a hydroxylating process. In the reduction process, a first aqueous solution containing an Li salt is subjected to the reduction method to produce a second aqueous solution containing the Li salt and the LiX. In the hydroxylating process, the Li salt in the second aqueous solution is hydroxylated to form the LiOH.

Figure 3:
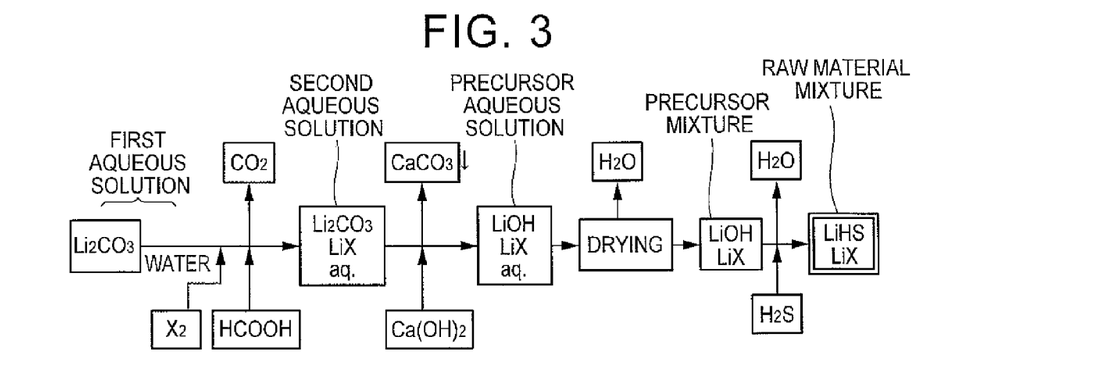
FIG. 3 is a flowchart that shows an example of a preparation step according to the invention.

Specifically, as illustrated in FIG. 3, the first aqueous solution containing an Li salt ($Li_2CO_3$) is produced. In the first embodiment, the first aqueous solution corresponds to the Li-containing aqueous solution. Subsequently, the first aqueous solution is subjected to the reduction method that uses $X_2$ and HCOOH. Thus, the second aqueous solution containing $Li_2CO_3$ and LiX is obtained. By adding a metal hydroxide, such as $Ca(OH)_2$, to the second aqueous solution, $Li_2CO_3$ is hydroxylated to f LiOH. Thus, a precursor aqueous solution containing LiOH and LiX is obtained. The metal hydroxide is ordinarily desirably the one that reacts with carbonate ions and that produces a precipitate of a carbonate. The metal hydroxide may be, for example, a hydroxide of an alkali earth metal.

For example, as described in a third embodiment (described later), when LiOH is subjected to the reduction method with the use of the reductant that produces $CO_2$, $L_1$ and $CO_2$ react with each other, and $Li_2CO_3$ may slightly remain in the precursor aqueous solution. In contrast, in the first embodiment, $Li_2CO_3$ present in the second aqueous solution is allowed to be precipitated and removed as a carbonate ($CaCO_3$) by the metal hydroxide (for example, $Ca(OH)_2$), so it is advantageously possible to suppress consumption of Li ions as $Li_2CO_3$. $Li_2CO_3$ is more advantageous than LiOH in stable and low-cost material. These advantages are also obtained in a second embodiment.

In FIG. 3, by causing $Ca(OH)_2$ to react with $Li_2CO_3$, $CaCO_3$ is precipitated while LiOH is dissolved. Therefore, the concentration of LiOH is desirably lower than or equal to a saturated solubility (0.522 mol/100 cc). $CaCO_3$ dissolves under a strong acid, so the pH of the solution after $Ca(OH)_2$ is added is, for example, desirably higher than or equal to 3 and more desirably higher than or equal to 5.

(2) Second Embodiment

In the second embodiment, the providing step is a step including a reduction process and a substitution process. In the reduction process, a third aqueous solution containing a hydroxide of a metal (Me) is subjected to the reduction method to produce a fourth aqueous solution containing a hydroxide of the Me and a halide of the Me. In the substitution process, the Me in the fourth aqueous solution is substituted by Li.

Figure 4:
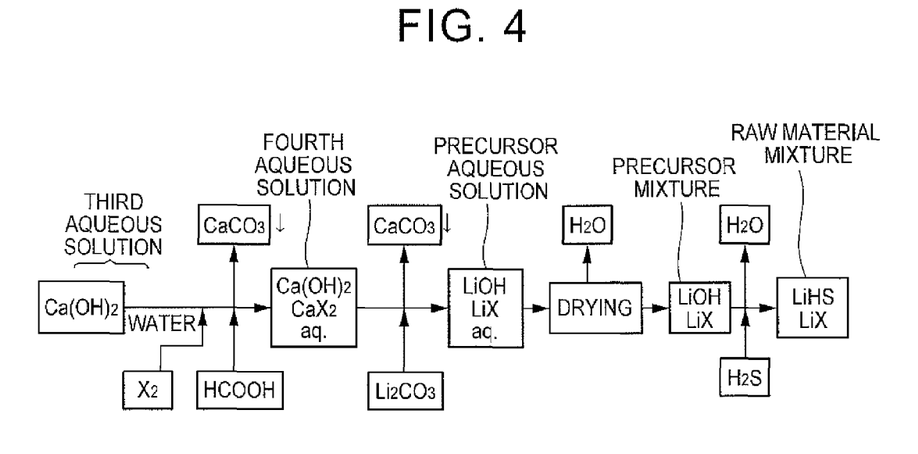
FIG. 4 is a flowchart that shows another example of a preparation step according to the invention.

Specifically, as illustrated in FIG. 4, a third aqueous solution containing a metal hydroxide, such as $Ca(OH)_2$, is produced. In the second embodiment, the third aqueous solution corresponds to the Li-containing aqueous solution. The Me is ordinarily the one that reacts with carbonate ions and is desirably the one that produces a precipitate of a carbonate. The Me may be, for example, an alkali earth metal. Subsequently, the third aqueous solution is subjected to the reduction method that uses $X_2$ and HCOOH. Thus, the fourth aqueous solution containing $Ca(OH)_2$ and $CaX_2$ is obtained. By adding an Li salt, such as $Li_2CO_3$, to the fourth aqueous solution, Ca is substituted by Li to form LiOH. Thus, a precursor aqueous solution containing LiOH and LiX is obtained. The second embodiment differs from the first embodiment in that an object ($Li_2CO_3$) of the reduction method and a process after the reduction method (addition of $Ca(OH)_2$) are interchanged.

(3) Third Embodiment

In the third embodiment, the providing step is a step including a reduction process and a mixing process. In the reduction process, part of a fifth aqueous solution containing the LiOH is separated, and the separated fifth aqueous solution is subjected to the reduction method to produce a sixth aqueous solution containing the LiX. In the mixing process, the sixth aqueous solution and the remaining part of the fifth aqueous solution are mixed.

Figure 5:
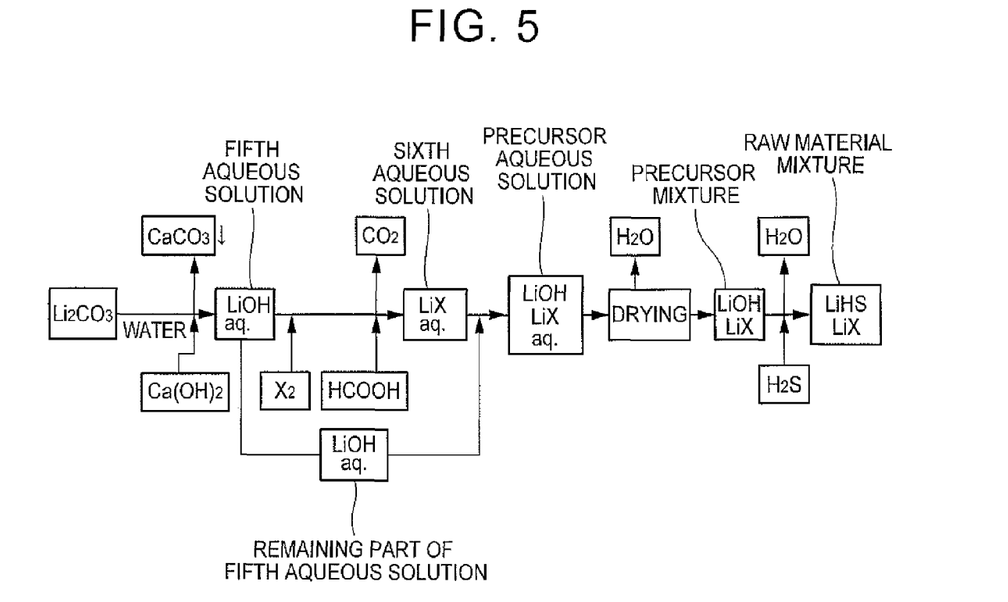
FIG. 5 is a flowchart that shows another example of a preparation step according to the invention.

Specifically, as illustrated in FIG. 5, the fifth aqueous solution containing LiOH is produced. In the third embodiment, the fifth aqueous solution corresponds to the Li-containing aqueous solution. In FIG. 5, $Li_2CO_3$ is used as a starting material. Instead, LiOH may be used as a starting material. Subsequently, part of the fifth aqueous solution is separated, and the separated fifth aqueous solution is subjected to the reduction method that uses $X_2$ and HCOOH. Thus, the sixth aqueous solution containing LiX is obtained. By mixing this sixth aqueous solution with the remaining part of the fifth aqueous solution, the precursor aqueous solution containing LiOH and LiX is obtained. The third embodiment has such an advantage that it is possible to obtain a precursor aqueous solution with a simple method.

2. Electrolyte Synthesizing Step

The electrolyte synthesizing step according to the invention is a step including a dehydrosulfurizing process and a synthesizing process. In the dehydrosulfurizing process, hydrogen sulfide is desorbed from the LiHS in the raw material mixture to form $Li_2S$. In the synthesizing process, a sulfide-based solid electrolyte material is synthesized.

The electrolyte synthesizing step is not specifically limited as long as the electrolyte synthesizing step includes the dehydrosulfurizing process and the synthesizing process. The sequence and timing of both the processes may be arbitrarily set. That is, in the electrolyte synthesizing step, at least desorbing hydrogen sulfide from LiHS to form $Li_2S$ and synthesizing a sulfide-based solid electrolyte material just need to be carried out. Among others, in the invention, after hydrogen sulfide is desorbed, it is desirable to synthesize a sulfide-based solid electrolyte material by adding a predetermined composition.

Figure 6:
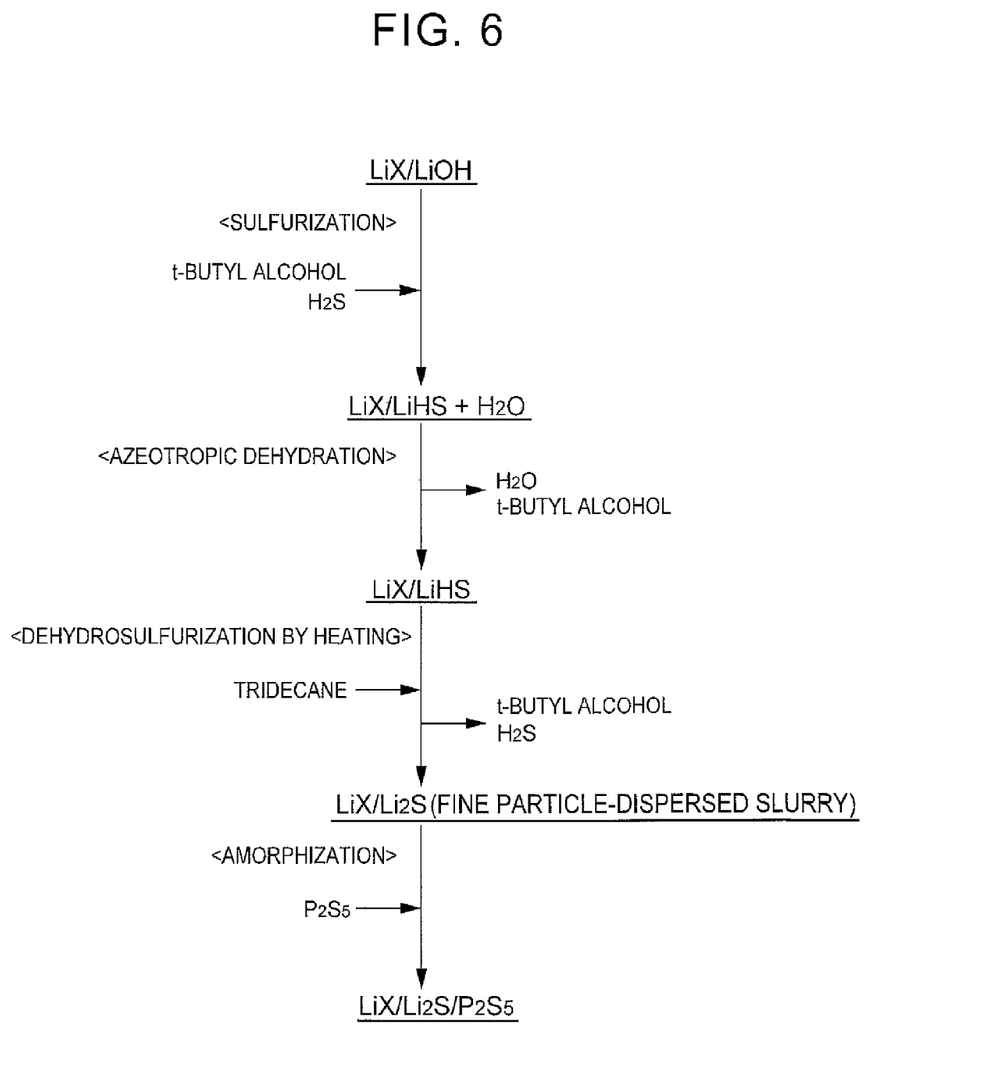
FIG. 6 is a flowchart that shows an example of a sulfurizing step and an electrolyte synthesizing step according to the invention.

Here, FIG. 6 is a flowchart that shows an example of the sulfurizing step and the electrolyte synthesizing step according to the invention. In FIG. 6, initially, t-butyl alcohol is added to LiX/LiOH, and the LiOH is sulfurized by $H_2S$. A material associated with the reaction dissolves in the t-butyl alcohol, so it is advantageous that uniform mixing is possible. Subsequently, water is removed by azeotropic dehydration. At this time, part of the t-butyl alcohol is also removed. Thus, LiX/LiHS is obtained. Subsequently, tridecane is added to the LiX/LiHS, hydrogen sulfide is desorbed by heating. Thus, the t-butyl alcohol and the hydrogen sulfide are removed. At this time, the t-butyl alcohol and the tridecane have an affinity for each other, so particles do not precipitate immediately after mixing even when the tridecane that is a poor solvent is added, and particles precipitate at the timing at which the percentage of the t-butyl alcohol is sufficiently decreased. Therefore, a slurry in which LiX and $Li_2S$ are uniformly and finely dispersed is obtained. The t-butyl alcohol uniformly evaporates in the tridecane, and crystal growth of a solute is inhibited, so a slurry in which LiX and $Li_2S$ are uniformly and finely dispersed is obtained. Subsequently, the obtained slurry is amorphized by adding $P_2S_5$ to the slurry. Thus, a sulfide-based solid electrolyte material expressed by $LiX/Li_2S/P_2S_5$ is obtained.

Figure 7:
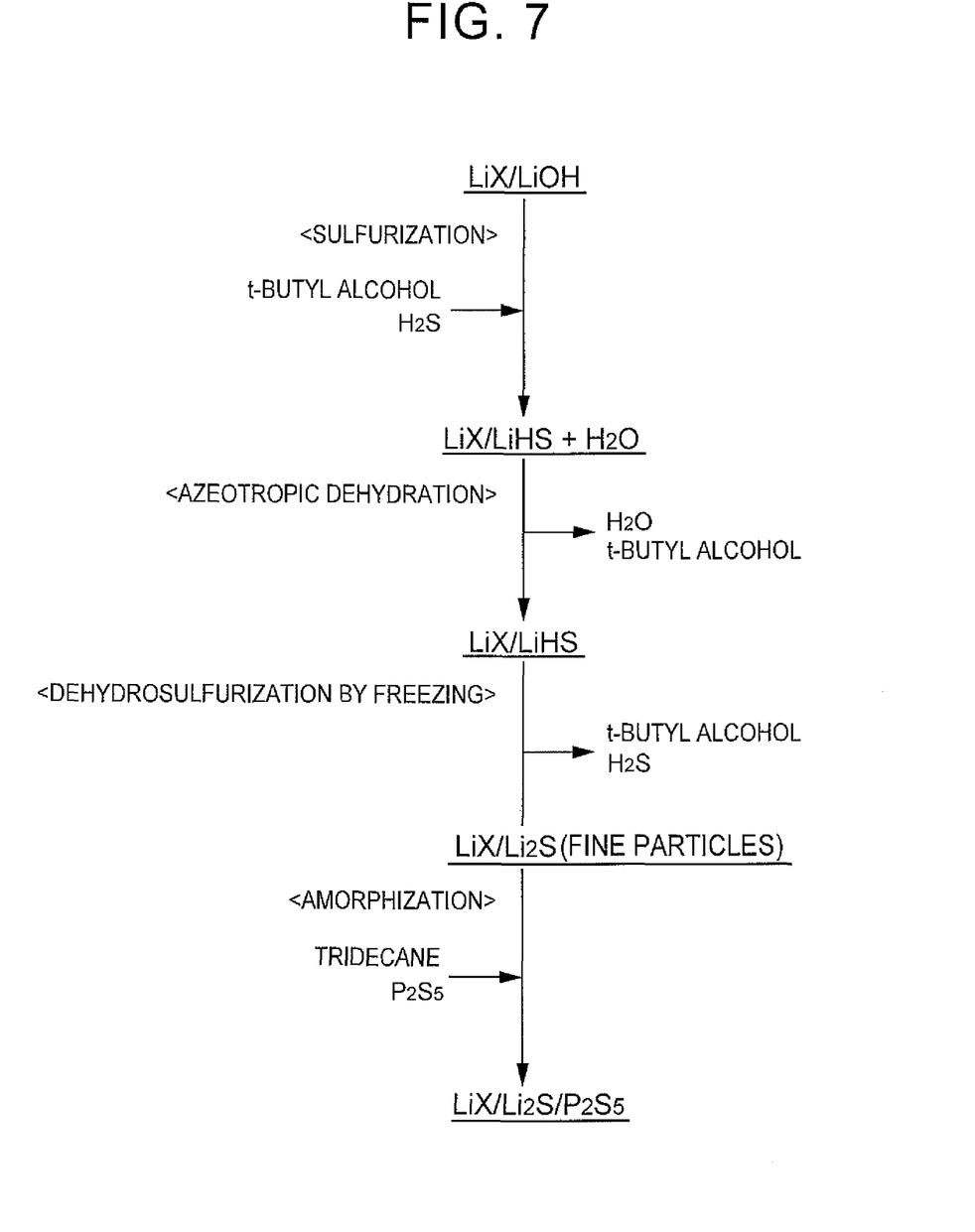
FIG. 7 is a flowchart that shows another example of a sulfurizing step and an electrolyte synthesizing step according to the invention.

FIG. 7 is a flowchart that shows another example of the sulfurizing step and the electrolyte synthesizing step according to the invention. In FIG. 7, initially, sulfurization and azeotropic dehydration as in the case of FIG. 6 are carried out, with the result that LiX/LiHS is obtained. Subsequently, hydrogen sulfide is desorbed from the LiX/LiHS by freeze drying. Thus, the t-butyl alcohol and the hydrogen sulfide are removed. Thus, fine particles of the LiX/Li$_2$S are obtained. T-butyl alcohol has a melting point of 25.69° C. and, therefore, easily freezes. The t-butyl alcohol has such an advantage that a uniform solid having a large specific area is obtained when a cooling speed is controlled. Subsequently, tridecane and P$_2$S$_5$ are added to the obtained fine particles to amorphize the obtained fine particles, with the result that a sulfide-based solid electrolyte material expressed by LiX/Li$_2$S/P$_2$S$_5$ is obtained.

(1) Dehydrosulfurizing Process

The dehydrosulfurizing process according to the invention is a process of desorbing hydrogen sulfide from the LiHS in the raw material mixture to form Li$_2$S. Specifically, the following reaction occurs.

$$2\text{LiHS} \rightarrow \text{Li}_2\text{S} + \text{H}_2\text{S}$$

The dehydrosulfurizing process is not specifically limited. For example, the dehydrosulfurizing process may be a heat drying process. The temperature of the heat drying process desirably, for example, falls within the range of 150° C. to 220° C., and more desirably falls within the range of 170° C. to 190° C. A period of time of the heat drying process desirably, for example, falls within the range of 15 minutes to 6 hours, and more desirably falls within the range of 30 minutes to 2 hours. The heat drying process is desirably carried out in a state where a raw material mixture is dissolved or dispersed in a solvent or carried out in an inert gas atmosphere. In the former case, particularly, an aprotic solvent is desirably used as the solvent, and a nonpolar aprotic solvent is more desirably used as the solvent. This is because it is possible to suppress degradation of Li$_2$S. The aprotic solvent may be a similar material to an aprotic solvent that will be described in the chapter of the synthesizing process (described later). Among others, the solvent that is used in the dehydrosulfurizing process is desirably a liquid alkane at room temperature (25° C.). On the other hand, the inert gas atmosphere may be, for example, an argon gas atmosphere, a nitrogen gas atmosphere, or the like. The dehydrosulfurizing process may be a freeze drying process.

In the invention, the sulfurizing step and the dehydrosulfurizing process may be carried out as a single reaction. Specifically, by setting the temperature, at which the LiOH in the precursor mixture containing LiOH and LiX is sulfurized, to a relatively high temperature, it is possible to continuously carry out sulfurization and dehydrosulfurization. The sulfurizing step and the dehydrosulfurizing process may be continuously carried out in a state where the precursor mixture is dissolved or dispersed in a solvent.

(2) Synthesizing Process

The synthesizing process according to the invention is a process of synthesizing a sulfide-based solid electrolyte material.

The synthesizing process according to the invention is not specifically limited as long as the synthesizing process is a process by which it is possible to obtain a desired sulfide-based solid electrolyte material. Among others, it is desirable to synthesize a sulfide-based solid electrolyte material by adding a composition containing an A element (A is one of P, Si, Ge, Al and B) and an S element. The composition may contain an A-containing compound as the A element and may contain an elemental A as the A element. The A-containing compound may be a sulfide of A, and may be specifically P$_2$S$_3$, P$_2$S$_5$, SiS$_2$, GeS$_2$, Al$_2$S$_3$, B$_2$S$_3$ or the like. The composition may contain two or more of A elements.

The composition may contain an S-containing compound as the S element or may contain an elemental S as the S element. The S-containing compound may be, for example, the above-described sulfide.

The composition of the sulfide-based solid electrolyte material is not specifically limited. For example, when a sulfide-based solid electrolyte material is synthesized by using a raw material containing Li$_2$S, P$_2$S$_5$ and LiX, the percentage of Li$_2$S to the total of Li$_2$S and P$_2$S$_5$ desirably falls within the range of 70 mol % to 80 mol %, more desirably falls within the range of 72 mol % to 78 mol %, and further desirably falls within the range of 74 mol % to 76 mol %. This is because it is possible to obtain a sulfide-based solid electrolyte material having a high chemical stability. Particularly, when the percentage of Li$_2$S is 75 mol % (when Li$_2$S:P$_2$S$_5$=75:25), it is possible to obtain a sulfide-based solid electrolyte material including an ionic conductor, having an ortho composition (Li$_3$PS$_4$), and LiX. When Al$_2$S$_3$ or B$_2$S$_3$ is used instead of P$_2$S$_5$ as well, the percentage of Li$_2$S desirably falls within the above range.

On the other hand, when a sulfide-based solid electrolyte material is synthesized by using a raw material containing Li$_2$S, SiS$_2$ and LiX, the percentage of Li$_2$S to the total of Li$_2$S and SiS$_2$ desirably falls within the range of 62.5 mol % to 70.9 mol %, more desirably falls within the range of 63 mol % to 70 mol %, and further desirably falls within the range of 64 mol % to 68 mol %. This is because it is possible to obtain a sulfide-based solid electrolyte material having a high chemical stability. Particularly, when the percentage of Li$_2$S is 66.7 mol % (when Li$_2$S:SiS$_2$=66.7:33.3), it is possible to obtain a sulfide-based solid electrolyte material including an ionic conductor, having an ortho composition (Li$_4$SiS$_4$), and LiX. When GeS$_2$ is used instead of SiS$_2$, the percentage of Li$_2$S desirably falls within the above range.

The percentage of LiX desirably, for example, falls within the range of 1 mol % to 60 mol %, more desirably falls within the range of 5 mol % to 50 mol %, further desirably falls within the range of 10 mol % to 40 mol %, and particularly desirably falls within the range of 10 mol % to 30 mol %. The percentage of LiX means the percentage of LiX to the total of a component (ionic conductor), other than LiX, and LiX. For example, it means x in xLiX·(100-x)(Li$_3$PS$_4$).

The synthesizing process of synthesizing a sulfide-based solid electrolyte material is not specifically limited as long as the process is able to obtain a desired sulfide-based solid electrolyte material. An example of the synthesizing process may include an amorphizing process. A sulfide-based solid electrolyte material that is a sulfide glass is ordinarily obtained through the amorphizing process. The amorphizing process may be, for example, mechanical milling or melt extraction. Among others, the amorphizing process is desirably mechanical milling. This is because the process is allowed at room temperature and, as a result, it is possible to simplify the manufacturing process. Melt extraction limits a reaction atmosphere or a reaction container; whereas mechanical milling has such an advantage that it is possible to simply synthesize a sulfide glass having an intended composition. Mechanical milling may be dry mechanical milling or wet mechanical milling. The latter is desirable. This is because it is possible to obtain a sulfide glass having a higher amorphous nature.

Mechanical milling is not specifically limited as long as the mechanical milling is a method of mixing a raw material while applying mechanical energy. For example, mechanical milling may be ball mill, vibrating mill, turbo mill, mechanofusion, disc mill, or the like. Among others, ball mill is desirable, and particularly planetary ball mill is desirable. This is because it is possible to efficiently obtain a desired sulfide glass.

Various conditions of mechanical milling are set such that a desired sulfide glass is obtained. For example, planetary ball mill is used, a raw material and grinding balls are added into a container, and the process is carried out at a predetermined rotation speed for a predetermined period of time. Generally, the production speed of a sulfide glass increases as the rotation speed increases, and the invert ratio from a raw material to a sulfide glass increases as the processing time extends. The rotation speed of a base at the time of planetary ball mill, for example, falls within the range of 200 rpm to 500 rpm. Among others, the rotation speed of the base desirably falls within the range of 250 rpm to 400 rpm. The processing time at the time of planetary ball mill, for example, falls within the range of 1 hour to 100 hours. Among others, the processing time desirably falls within the range of 1 hour to 50 hours. The material of the container and grinding balls that are used in ball mill may be, for example, $ZrO_2$, $Al_2O_3$, or the like. The diameter of each grinding ball, for example, falls within the range of 1 mm to 20 mm.

The solvent that is used in wet mechanical milling desirably has a property such that the solvent does not produce hydrogen sulfide in a reaction with a raw material. Hydrogen sulfide is produced when protons dissociated from molecules of the solvent react with a raw material or a sulfide glass. Therefore, the solvent desirably has an aprotic property to such a degree that no hydrogen sulfide is produced. The aprotic solvent is ordinarily roughly classified into a polar aprotic solvent and a nonpolar aprotic solvent.

The polar aprotic solvent is not specifically limited. For example, the polar aprotic solvent may be a ketone, such as acetone; a nitrile, such as acetonitrile; an amide, such as N,N-dimethylformamide (DMF); a sulfoxide, such as dimethylsulfoxide (DMSO), or the like.

An example of the nonpolar aprotic solvent may be a liquid alkane at room temperature (25° C.). The alkane may be a chain alkane or a cyclic alkane. The carbon number of the chain alkane is desirably, for example, larger than or equal to 5. On the other hand, the upper limit of the carbon number of the chain alkane is not specifically limited as long as the chain alkane is liquid at room temperature. A specific example of the chain alkane may be pentane, hexane, heptane, octane, nonane, decane, undecane, dodecane, tridecane, paraffin, or the like. The chain alkane may have a branch. On the other hand, a specific example of the cyclic alkane may be cyclopentane, cyclohexane, cycloheptane, cyclooctane, cycloparaffin, or the like.

Another example of the nonpolar aprotic solvent may be an aromatic hydrocarbon, such as benzene, toluene and xylene; a chain ether, such as diethyl ether and dimethyl ether; a cyclic ether, such as tetrahydrofuran; an alkyl halide, such as chloroform, methyl chloride and methylene chloride; an ester, such as ethyl acetate; a fluorine-based compound, such as fluorobenzene, fluoroheptane, 2,3-dihydroperfluoropentane and 1,1,2,2,3,3,4-heptafluorocyclopentane, or the like. The additive amount of the solvent is not specifically limited, and may be an amount to such a degree that it is possible to obtain a desired sulfide-based solid electrolyte material.

Another example of the synthesizing process may include an amorphizing process and a heat treatment. By carrying out the heat treatment after the amorphizing process, it is possible to obtain a sulfide-based solid electrolyte material that is a glass ceramics.

The heat treatment temperature is ordinarily a temperature higher than or equal to a crystallization temperature of the sulfide glass. The crystallization temperature of the sulfide glass is allowed to be determined through differential thermal analysis (DTA). The heat treatment temperature is not specifically limited as long as the temperature is higher than or equal to the crystallization temperature. For example, the heat treatment temperature is desirably higher than or equal to 160° C. On the other hand, the upper limit of the heat treatment temperature is not specifically limited as long as the temperature allows a desired glass ceramics to be synthesized, and slightly varies depending on the composition of the sulfide glass. The upper limit of the heat treatment temperature is, for example, a temperature near 200° C. and at which the glass ceramics is allowed to be synthesized.

A heat treatment time is not specifically limited as long as the heat treatment time allows a desired glass ceramics to be obtained. For example, the heat treatment time desirably falls within the range of 1 minute to 24 hours. The heat treatment is desirably carried out in an inert gas atmosphere (for example, Ar gas atmosphere). This is because it is possible to prevent degradation (for example, oxidation) of a glass ceramics. A method for the heat treatment is not specifically limited. For example, the method may be a method that uses a firing furnace.

Further another example of the synthesizing process may include a solid phase reaction process. With the solid phase reaction process, it is possible to obtain a sulfide-based solid electrolyte material that is a crystalline material.

3. Sulfide-based Solid Electrolyte Material

The sulfide-based solid electrolyte material that is obtained in the invention at least includes LiX, and ordinarily includes an ionic conductor (for example, $Li_3PS_4$) other than the LiX. At least part of the LiX is desirably ordinarily present in a state where the LiX is incorporated in the structure of the ionic conductor as an LiX component.

The ionic conductor desirably, for example, includes Li, A (A is at least one of P, Si, Ge, Al and B) and S. Among others, the ionic conductor more desirably includes an ortho composition or a composition close to the ortho composition. This is because the sulfide-based solid electrolyte material has a high chemical stability. Specifically, the ionic conductor desirably mainly contains an anion structure ($PS_4^{3-}$ structure, $SiS_4^{4-}$ structure, $GeS_4^{4-}$ structure, $AlS_3^{3-}$ structure, $BS_3^{3-}$ structure) having an ortho composition. The percentage of the anion structure having an ortho composition is desirably higher than or equal to 60 mol % with respect to the total anion structures in the ionic conductor, more desirably higher than or equal to 70 mol %, further desirably higher than or equal to 80 mol %, and particularly desirably higher than or equal to 90 mol %. The percentage of the anion structure having an ortho composition is determined by Raman scattering spectroscopy, NMR, XPS, or the like.

The sulfide-based solid electrolyte material desirably does not substantially contain $Li_2S$. This is because the sulfide-based solid electrolyte material produces a small amount of hydrogen sulfide. When $Li_2S$ reacts with water, hydrogen sulfide is produced. For example, when the percentage of $Li_2S$ contained in a raw material is high, $Li_2S$ tends to remain. The fact that "$Li_2S$ is not substantially contained" may be determined by X-ray diffraction. Specifically, when there is no peak for $Li_2S$ ($2\theta=27.0°$, $31.2°$, $44.8°$, $53.1°$), it may be determined that substantially no $Li_2S$ is contained.

The sulfide-based solid electrolyte material desirably does not substantially contain cross-linked sulfur. This is because the sulfide-based solid electrolyte material produces a small amount of hydrogen sulfide. The "cross-linked sulfur" means cross-linked sulfur in a compound that is formed from the reaction between $Li_2S$ and a sulfide of the A. For example, cross-linked sulfur having an $S_3P$—S—$PS_3$ structure that is formed from the reaction between $Li_2S$ and $P_2S_5$ corresponds to the "cross-linked sulfur". Such cross-linked sulfur easily reacts with water, and hydrogen sulfide is easily produced. In addition, the fact that "no cross-linked sulfur is substantially contained" may be determined by Raman scattering spectroscopy. For example, in the case of an $Li_2S$—$P_2S_5$-based sulfide-based solid electrolyte material, the peak of the $S_3P$—S—$PS_3$ structure ordinarily appears at 402 cm$^{-1}$. Therefore, it is desirable that this peak be not detected. The peak of the $PS_4^{3-}$ structure ordinarily appears at 417 cm$^{-1}$. In the invention, the intensity $I_{402}$ at 402 cm$^{-1}$ is desirably lower than the intensity $I_{407}$ at 417 cm$^{-1}$. More specifically, for example, with respect to the intensity $I_{417}$, the intensity $I_{402}$ is desirably lower than or equal to 70%, more desirably lower than or equal to 50%, and further desirably lower than or equal to 35%. In addition, in the case of a sulfide-based solid electrolyte material other than the $Li_2S$—$P_2S_5$-based solid electrolyte material as well, a unit that contains cross-linked sulfur is identified and then the peak of the unit is measured. Thus, it is possible to determine that the sulfide-based solid electrolyte material is substantially free of cross-linked sulfur.

The sulfide-based solid electrolyte material may be a sulfide glass, may be a glass ceramics (crystallized sulfide glass) or may be a crystalline material. The sulfide glass means a material that is obtained by amorphizing and synthesizing raw materials. The sulfide glass does not mean only a proper "glass" from which a periodicity as a crystal is not observed through X-ray diffraction measurement, or the like, but also means a material that is amorphized and synthesized through the above-described mechanical milling, or the like. Therefore, for example, even when a peak that originates from a raw material (LiI, or the like) is observed through X-ray diffraction measurement, or the like, but when the material is amorphized and synthesized, the material corresponds to a sulfide glass. The glass ceramics means a material obtained by crystallizing a sulfide glass. Whether it is a glass ceramics is allowed to be determined by, for example, X-ray diffraction measurement. The crystalline material is, for example, allowed to be obtained through the solid phase reaction process.

The shape of the sulfide-based solid electrolyte material may be, for example, a particulate shape. The mean particle diameter ($D_{50}$) of the particulate sulfide-based solid electrolyte material desirably, for example, falls within the range of 0.1 μm to 50 μm. The sulfide-based solid electrolyte material desirably has a high lithium ion conductivity. The lithium ion conductivity at room temperature is desirably, for example, higher than or equal to $1\times10^{-4}$ S/cm, and more desirably higher than or equal to $1\times10^{-3}$ S/cm. The sulfide-based solid electrolyte material may be used in any application that utilizes lithium ion conduction. Among others, the sulfide-based solid electrolyte material is desirably used in a battery.

The invention is not limited to the above-described embodiments. The above-described embodiments are only illustrative. The scope of the invention encompasses any embodiment that includes substantially equivalent components and has substantially similar advantageous effects to those of the technical ideas recited in the appended claims of the invention.

Hereinafter, the invention will be more specifically described with reference to examples.

REFERENCE EXAMPLE

In Reference Example, $Ca(OH)_2$ was set as a starting material, and LiI was synthesized by using $Li_2CO_3$. Specifically, the synthesis expressed by the following reaction formulas 1, 2 was carried out.

$Ca(OH)_2+I_2+HCOOH \rightarrow CaI_2+2H_2O+CO_2$  (Reaction Formula 1)

$CaI_2+Li_2CO_3 \rightarrow 2LiI+CaCO_3$  (Reaction Formula 2)

Initially, 2.43 g of $Ca(OH)_2$ was put into 100 g of deaerated ultrapure water, and 8.33 g (1 equivalent weight with respect to $Ca(OH)_2$) of $I_2$ was also put into the ultrapure water. Subsequently, 1.59 g (1.05 equivalent weight with respect to $I_2$) of HCOOH was put in while being stirred, and the solution was held at 80° C. in an Ar stream for 1 hour.

After that, 2.42 g (0.998 equivalent weight with respect to $CaI_2$) of $Li_2CO_3$ was put in, and the solution was held for 1 hour. The obtained solution took on a yellow tinge, and its pH was about 3 indicating acid. After being cooled, a precipitated solid content (solid content A) was recovered through filtration. The filtrate was heated and dried under a reduced pressure at 50° C., and a solid content of the filtrate (solid content B) was recovered. The pH of the cooled filtrate was about 5 indicating acid. The drying speed of the filtrate was slow, and a grease-like semisolid content adhered to the inner face of a flask in the second half of the drying process.

The obtained solid contents A, B were subjected to X-ray diffraction (XRD) measurement. As a result, the peak of $CaCO_3$ was observed for the solid content A, the peak of LiI was observed for the solid content B, and those were separated in a state close to a single phase. Inductively coupled plasma (ICP) measurement was carried out on the solid content B. It was confirmed that the solid content B has a purity of about 97.5% as LiI on the basis of the Li concentration. On the other hand, the solid content B contained about 0.07% of Ca (which corresponds to 0.13 percent by weight for $Ca(OH)_2$, and 0.5 percent by weight for $CaI_2$). This is understood that the remaining amount of Ca is reasonable in consideration of the fact that the amount of put-in $Li_2CO_3$ is smaller by 0.2% than that of $CaI_2$ in the reaction formula 2.

EXPERIMENTAL EXAMPLE 1-1

A precursor mixture containing LiOH and LiX was produced in accordance with the flowchart shown in FIG. 3. Initially, 2.42 g of $Li_2CO_3$ was put into 100 g of deaerated ultrapure water, and 1.19 g (½ equivalent weight with respect to $Li_2CO_3$) of $I_2$ was also put into the ultrapure water. Subsequently, 0.23 g (1.05 equivalent weight with respect to $I_2$) of HCOOH was put in while being stirred, and the solution was held at 80° C. in an Ar stream for 1 hour.

After that, 2.07 g (1 equivalent weight with respect to unreacted $Li_2CO_3$) of $Ca(OH)_2$ was put in, and the solution was held at 80° C. for 1 hour. After being cooled, a precipitated solid content (solid content A) was recovered through filtration. The filtrate was heated and dried under a reduced pressure at 50° C., and a solid content of the filtrate (solid content B) was recovered. The obtained solid contents A, B were subjected to X-ray diffraction (XRD) measurement. As a result, the peak of $CaCO_3$ was observed for the solid content A, and the peak of LiOH and the peak of LiI were observed for the solid content B. The molar ratio between LiI and LiOH in the solid content B corresponds to LiI:LiOH=1:6.

EXPERIMENTAL EXAMPLE 1-2

A precursor mixture containing LiOH and LiX was produced in accordance with the flowchart shown in FIG. 4. Initially, 2.43 g of $Ca(OH)_2$ was put into 100 g of deaerated ultrapure water, and 1.19 g (½ equivalent weight with respect to $Ca(OH)_2$) of $I_2$ was also put into the ultrapure water. Subsequently, 0.23 g (1.05 equivalent weight with respect to $I_2$) of HCOOH was put in while being stirred, and the solution was held at 80° C. in an Ar stream for 1 hour.

After that, 2.42 g (1 equivalent weight with respect to $Ca(OH)_2$ and $CaI_2$) of $Li_2CO_3$ was put in, and the solution was held at 80° C. for 1 hour. After being cooled, a precipitated solid content (solid content A) was recovered through filtration. The filtrate was heated and dried under a reduced pressure at 50° C., and a solid content of the filtrate (solid content B) was recovered. The obtained solid contents A, B were subjected to X-ray diffraction (XRD) measurement. As a result, the peak of $CaCO_3$ was observed for the solid content A, and the peak of LiOH and the peak of LiI were observed for the solid content B. The molar ratio between LiI and LiOH in the solid content B corresponds to LiI:LiOH=1:6.

EXPERIMENTAL EXAMPLE 2-1

A precursor mixture was sulfurized in ethanol. Initially, a precursor aqueous solution containing LiI and LiOH at the molar ratio of LiI:LiOH=1:6 was provided. The total concentration of LiI and LiOH was set to 8 percent by weight. Subsequently, the precursor aqueous solution was dried in a vacuum at 90° C. for 12 hours with the use of a rotary evaporator. Thus, the precursor mixture was obtained. Subsequently, the precursor mixture was added into ethanol. At least part of LiOH contained in the precursor mixture dissolved in the ethanol. Subsequently, the obtained solute was subjected to circulation of $H_2S$ gas at 80° C. for 1 hour while being stirred. Thus, fine particles of the precursor mixture were formed, and the obtained solution was dispersed to such a degree that no precipitate is produced even when a stirrer is stopped. Part of the obtained solution was sampled, diluted with water by a dilution factor of 10, and its pH was measured. Then, neutralization proceeded to such a degree that pH=8.05 to 8.3. At this value of pH, there is no unreacted LiOH, so it showed that the LiOH was sulfurized and then LiHS was obtained.

Subsequently, when the obtained solution was put into tridecane, the solution steeply turned into a whitish liquid. This is presumably because the ethanol was incorporated into the tridecane and the solute dissolved in the ethanol was precipitated. Subsequently, in a state of circulation of $H_2S$ gas and Ar gas, the solution was dried at 90° C. for about 12 hours. Thus, the ethanol and the water were removed. After that, the temperature of the obtained substance was increased to 190° C. and held for 1 hour. After that, circulation of $H_2S$ was stopped, only Ar gas was circulated, and hydrogen sulfide was desorbed from LiHS. Thus, $Li_2S$ was obtained.

Figure 8:
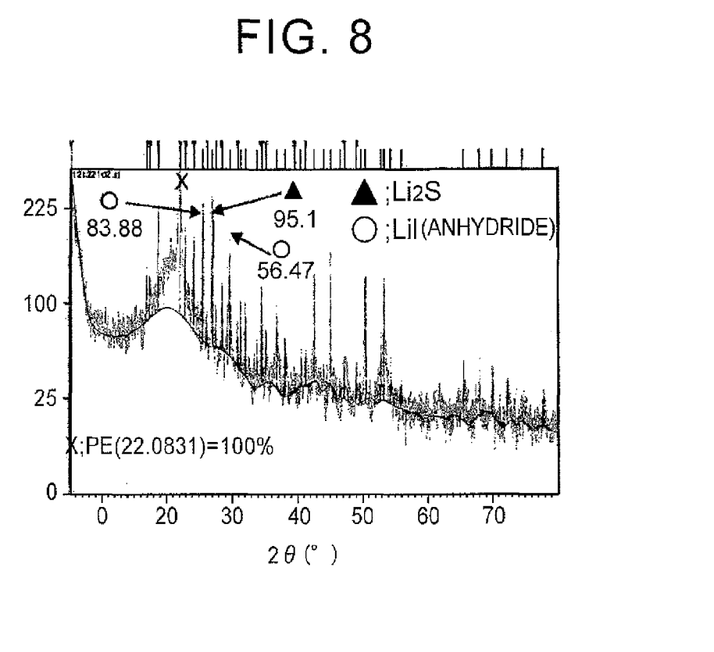
FIG. 8 is the result of an XRD measurement on a solid content obtained in Experimental Example 2-1.

XRD measurement was carried out on the obtained solid content. The result is shown in FIG. 8. As shown in FIG. 8, the peak of $Li_2S$ and the peak of LiI (anhydride) were obtained. Although not shown in the graph, in thermogravimetry and differential thermal analysis (TG-DTA), gentle weight reduction is seen from 150° C. This presumably indicates that hydrogen sulfide was desorbed from LiHS. In this way, by using an alcohol, such as ethanol, it was confirmed that LiOH was sulfurized and LiI (anhydride) was obtained.

EXPERIMENTAL EXAMPLE 2-2

A precursor mixture was sulfurized in t-butyl alcohol. Initially, a precursor aqueous solution containing LiI and LiOH at the molar ratio of LiI:LiOH=1:6 was provided. The total concentration of LiI and LiOH was set to 8 percent by weight. Subsequently, the precursor aqueous solution was dried in a vacuum at 90° C. for 12 hours with the use of a rotary evaporator. Thus, the precursor mixture was obtained. Subsequently, the precursor mixture was added into t-butyl alcohol. At least part of LiOH contained in the precursor mixture dissolved in the t-butyl alcohol. Subsequently, the obtained solute was subjected to circulation of $H_2S$ gas (about twice of equivalent weight with respect to LiOH) at 80° C. while being stirred. Part of the obtained solution was sampled, diluted with water by a dilution factor of 10, and its pH was measured. Then, neutralization proceeded to such a degree that pH=7.62 (before circulation of $H_2S$, pH=11.14). At this value of pH, there is no unreacted LiOH, so it showed that the LiOH was sulfurized and then LiHS was obtained.

Subsequently, when the obtained solution was put into tridecane. Different from Experimental Example 2-1, the solution did not turn into a whitish liquid. Subsequently, in a state of circulation of $H_2S$ gas and Ar gas, the solution was dried at 100° C. for about 12 hours. Thus, the t-butyl alcohol and the water were removed. After that, the temperature of the obtained substance was increased to 190° C. and held for 1 hour. After that, circulation of $H_2S$ was stopped, only Ar gas was circulated, and hydrogen sulfide was desorbed from LiHS. Thus, $Li_2S$ was obtained. Thus, a slurry was obtained.

Figure 9:
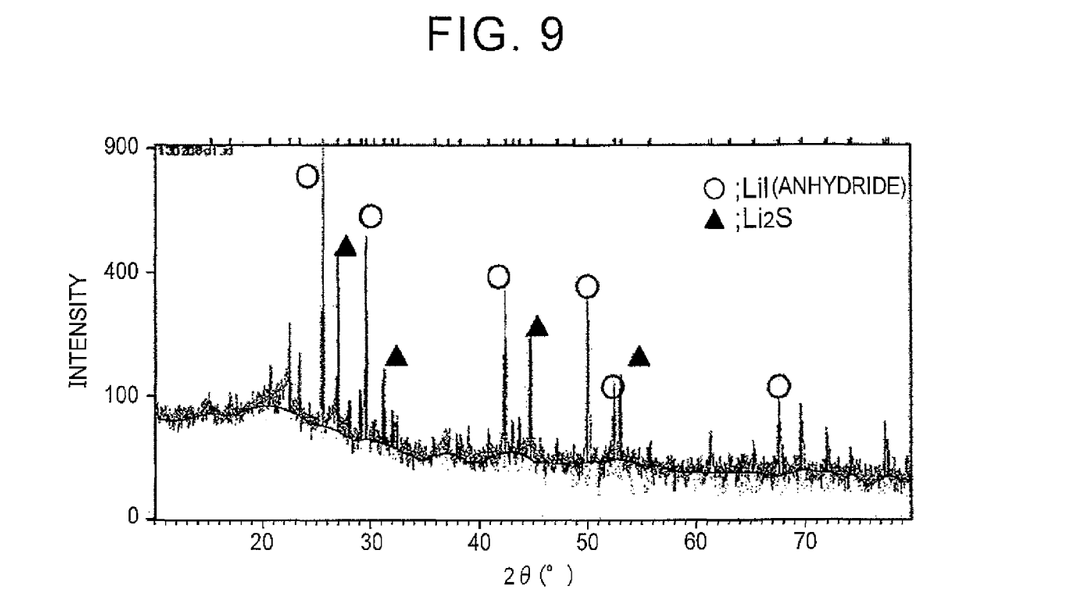
FIG. 9 is the result of an XRD measurement on a solid content obtained in Experimental Example 2-2.

After that, XRD measurement was carried out on the solid content recovered through filtration. The result is shown in FIG. 9. As shown in FIG. 9, the peak of $Li_2S$ and the peak of LiI (anhydride) were obtained. Although not shown in the graph, partial flocculation was recognized as a result of SEM observation; however, it was confirmed that fine particles were formed such that primary particles of $Li_2S$ and primary particles of LiI (anhydride) are uniformly mixed with each other on the order of submicrons.

EXPERIMENTAL EXAMPLE 2-3

A precursor mixture was sulfidized in tridecane. Initially, a precursor aqueous solution containing LiI and LiOH at the molar ratio of LiI:LiOH=1:6 was provided. The total concentration of LiI and LiOH was set to 8 percent by weight. Subsequently, the precursor aqueous solution was dried in a vacuum at 90° C. for 12 hours with the use of a rotary evaporator. Thus, the precursor mixture was obtained. Subsequently, the precursor mixture was added into tridecane. LiOH contained in the precursor mixture was not dissolved but dispersed in the tridecane. Subsequently, the obtained solute was subjected to circulation of $H_2S$ gas at 150° C. for 7 hour while being stirred. Subsequently, the obtained solution was dried at 190° C. for about 8 hours in a state of circulation of Ar gas to the obtained solution. Thus, hydrogen sulfide was desorbed from LiHS. After that, ICP analysis was carried out on the solid content recovered through filtration to obtain an Li/S ratio, and it was confirmed that 31.1% of 6LiOH, that is, about 2 mol of LiOH, was sulfurized. In this way, even when tridecane was used, sulfurization of LiOH occurs. However, it showed that, under this condition, the efficiency of sulfurization of LiOH is lower than those of Experimental Examples 2-1, 2-2.

EXPERIMENTAL EXAMPLE 2-4

A precursor mixture was sulfurized in a gaseous phase. Initially, a precursor aqueous solution containing LiI and LiOH at the molar ratio of LiI:LiOH=1:6 was provided. The total concentration of LiI and LiOH was set to 8 percent by weight. Subsequently, the precursor aqueous solution was dried in a vacuum at 90° C. for 12 hours with the use of a rotary evaporator. Thus, the precursor mixture was obtained. Subsequently, the precursor mixture was held at 300° C. or 380° C. for 1 hour in a state of circulation of $H_2S$. The obtained powder included particles having a primary particle diameter of about 2 μm without extreme grain growth. The result of ICP analysis showed that sulfurization of LiOH occurs but, under this condition, the efficiency of sulfurization of LiOH is lower than those of Experimental Examples 2-1, 2-2.

EXAMPLE 1

A precursor mixture containing LiOH and LiX was obtained by a similar method to that of Experimental Example 1-1. The obtained precursor mixture was subjected to sulfurizing process through a similar method to that of Experimental Example 2-2. The obtained slurry was put in the container for planetary ball mill in an Ar gas atmosphere, and $P_2S_5$ was further added. The additive amount of $P_2S_5$ was adjusted to the molar ratio of $Li_2S:P_2S_5$=75:25. In addition, $ZrO_2$ balls were put in, and the container was completely hermetically sealed. The container was set in a planetary ball mill machine (P7 produced by Fritsch), and mechanical milling of one-hour processing and 15-minute stop was carried out 40 times at the base rotation speed of 500 rpm. Thus, a sulfide glass was obtained. It was confirmed with the use of an alternating-current impedance method that the sulfide glass has a predetermined lithium ion conductivity.

EXAMPLE 2

A precursor mixture containing LiOH and LiX was obtained by a similar method to that of Experimental Example 1-2. The obtained precursor mixture was subjected to sulfurizing process through a similar method to that of Experimental Example 2-2. The obtained slurry was put in the container for planetary ball mill in an Ar gas atmosphere, and $P_2S_5$ was further added. The additive amount of $P_2S_5$ was adjusted to the molar ratio of $Li_2S:P_2S_5$=75:25. In addition, $ZrO_2$ balls were put in, and the container was completely hermetically sealed. The container was set in a planetary ball mill machine (P7 produced by Fritsch), and mechanical milling of one-hour processing and 15-minute stop was carried out 40 times at the base rotation speed of 500 rpm. Thus, a sulfide glass was obtained. It was confirmed with the use of an alternating-current impedance method that the sulfide glass has a predetermined lithium ion conductivity.

What is claimed is:

1. A manufacturing method for a sulfide-based solid electrolyte material, comprising:
    preparing a raw material mixture, containing LiHS and LiX from a single lithium source; and
    desorbing hydrogen sulfide from the LiHS in the raw material mixture to form $Li_2S$ and synthesizing a sulfide-based solid electrolyte material from the LiX and the $Li_2S$;
    wherein X is one of F, Cl, Br and I.

2. The manufacturing method according to claim 1, wherein preparing the raw material mixture includes:
    providing a precursor aqueous solution containing LiOH and the LiX by subjecting an Li-containing aqueous solution to a reduction method that uses $X_2$ and a reductant;
    obtaining a precursor mixture containing the LiOH and the LiX by removing moisture through drying of the precursor aqueous solution; and
    sulfurizing the LiOH in the precursor mixture to form the LiHS.

3. The manufacturing method according to claim 2, wherein providing the precursor aqueous solution includes subjecting a first aqueous solution containing a Li salt to the reduction method to produce a second aqueous solution containing the Li salt and the LiX and a hydroxylating process of hydroxylating the Li salt in the second aqueous solution to form the LiOH.

4. The manufacturing method according to claim 2, wherein providing the precursor aqueous solution includes subjecting a third aqueous solution containing a hydroxide of a metal to the reduction method to produce a fourth aqueous solution containing the hydroxide of the metal and a halide of the metal and a substitution process of substituting the metal in the fourth aqueous solution by Li.

5. The manufacturing method according to claim 2, wherein providing the precursor aqueous solution includes subjecting separated part of a fifth aqueous solution containing the LiOH to the reduction method to produce a sixth aqueous solution containing the LiX and mixing the sixth aqueous solution with the remaining part of the fifth aqueous solution.

6. The manufacturing method according to claim 2, wherein the LiOH is sulfurized in a polar solvent.

7. The manufacturing method according to claim 1, wherein the synthesizing process includes an amorphizing process, and the sulfide-based solid electrolyte material is a sulfide glass.

8. The manufacturing method according to claim 1, wherein the synthesizing process includes an amorphizing process and a heat treatment, and the sulfide-based solid electrolyte material is a glass ceramics.

* * * * *